United States Patent [19]

Näf

[11] 3,756,715

[45] Sept. 4, 1973

[54] TAPE RECORDER WITH CONTROL DEVICE FOR A SLIDE PROJECTOR

[75] Inventor: Otto Näf, Kilchberg, Switzerland

[73] Assignee: Ganz & Co., Zurich, Switzerland

[22] Filed: Mar. 4, 1971

[21] Appl. No.: 100,099

[30] Foreign Application Priority Data

Mar. 6, 1970 Switzerland ........................ 3306/70

[52] U.S. Cl. ............... 353/15, 35/8 A, 179/100.2 S

[51] Int. Cl. .......................................... G03b 31/06

[58] Field of Search ........................ 353/15; 35/8 A; 352/16, 135; 179/100.2 S

[56] References Cited

UNITED STATES PATENTS

| | | | |
|---|---|---|---|
| 3,447,864 | 6/1969 | Shadley | 353/15 |
| 2,787,669 | 4/1957 | Flan et al. | 35/8 A |
| 3,257,515 | 6/1966 | Nakamatsu | 179/100.2 S |

*Primary Examiner*—Louis R. Prince
*Assistant Examiner*—Steven L. Stephan
*Attorney*—Robert D. Flynn and Stephen H. Frishauf

[57] ABSTRACT

A tape recorder and a slide projector, especially intended for language teaching systems, with a control device, by means of which a change of picture can be obtained on the slide projector for exact synchronisation of the projected picture and the corresponding section of the tape, even when the tape is wound back over any desired length for the purpose of repeating the text.

11 Claims, 1 Drawing Figure

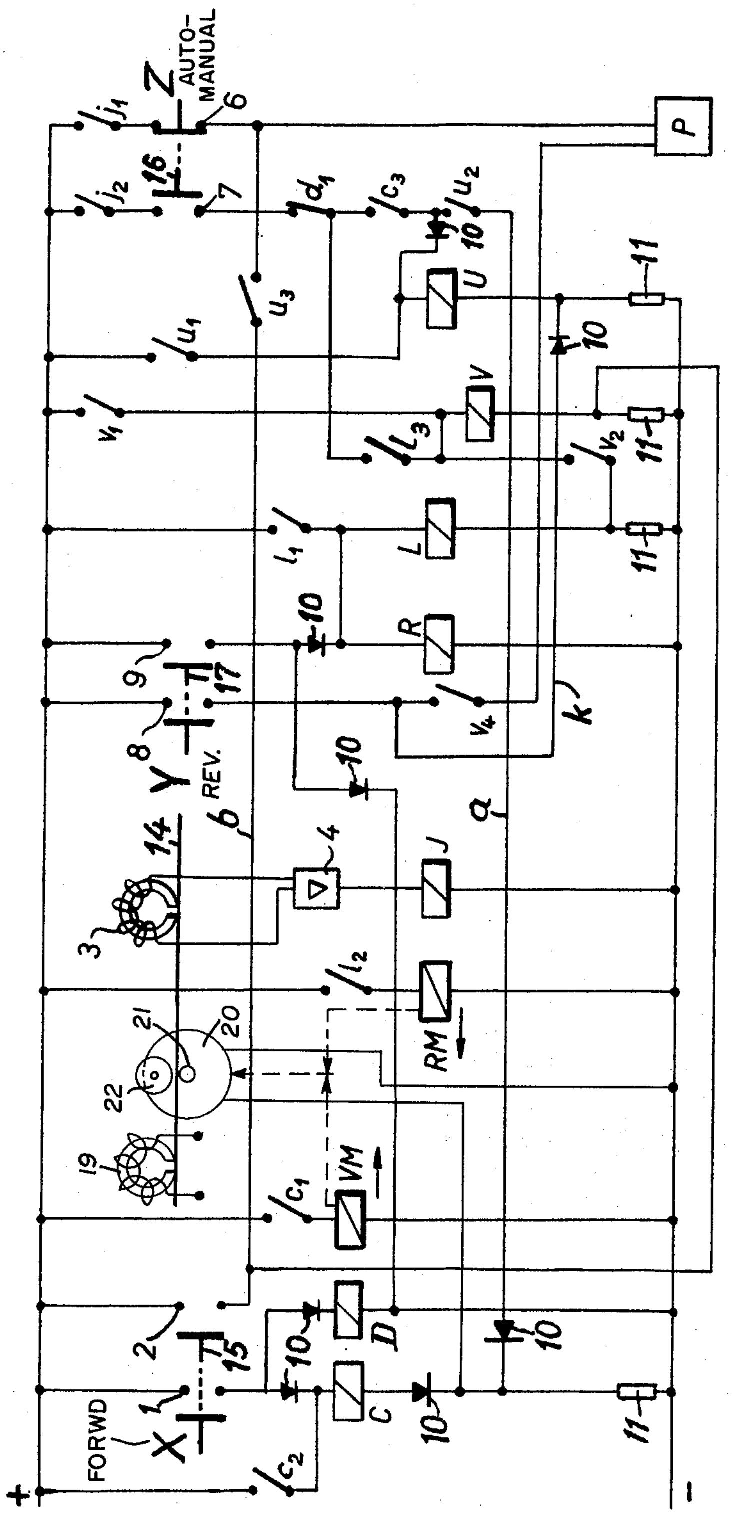
AUTO-
MANUAL
FORWD
REV.
P
U
V
L
R
J
RM
VM
C
D

TAPE RECORDER WITH CONTROL DEVICE FOR A SLIDE PROJECTOR

The invention relates to a tape recorder with a control device for a slide projector, especially for language teaching systems.

There is a known system operating with a pilot tone or control impulses for synchronizing a magnetic sound-recording tape with the operation of a picture projector, so that text sections are always associated with a particular picture. These systems are intended to produce a continuous tape playback with still pictures. If, however, it is desired to repeat sections of texts, which is often the case with language teaching systems, then such equipment gets easily out of phase, i.e., sound and picture do not coincide after playback. A further complication arises in the case of normal commercial tape recorders, in which the tape is separated from contact with the pick-up head when being wound backwards.

It is an object of the invention to ensure an exact synchronisation of sound and picture even after tape rewind of any individual length of text.

It is another object of the present invention to provide for the recording and reproducing of additional control signals without affecting in any manner the quality of recordation or reproduction of the main signal.

Another more specific object relating to providing a tape recorder with a fixed, built-in magnetic tape head, additional to the head for the magnetic main signal and which, during forward- and back-winding of the tape, is in contact with the tape.

These and other objects, uses and advantages of the invention will become apparent to those skilled in the art from the following drawing, description and claims.

The drawing shows a schematic circuit diagram according to the invention.

The device described hereafter is best used in language teaching systems and gives the possibility of repeating single text sections of any desired length as often as is desired, whilst, at the same time, projecting the picture related to the text. The tape or magnetogram carrier is played on a sound track, that is, for example, the one provided with the teacher's text, whilst either on a second parallel track or on an additional control track located between two normal sound tracks control signals are recorded. These control signals can be set onto the tape during the first play of the tape 14, by means of a hand operated built-in control head of pick-up head or transducer in the tape recorder. A control impulse signal will be put on the tape either before or at the very beginning of a new text section, i.e., always whenever a change of picture is to follow.

To start the tape 14 playing, push-button X of the tape recorder is briefly operated. The switch parts of this push-button operating the contacts 1, 2 are mechanically joined together by a coupling means 15. Therefore contacts 1, 2 are briefly closed and push-button X returns to its original position when the pressure on the button is stopped. With this push-button X the tape recorder is switched on, the tape is moved past a main or operating sound reproducing-head 19 and the lecture recorded on the tape ir transmitted through a loudspeaker. In addition to the usual main signal-head a further control head 3 is arranged in the tape recorder with which the control signals from the tape can be reproduced. This control head 3 is connected to an amplifier 4 which is connected to an impulse relay J. Control head 3 is not removed from the tape during wind-back — contrary to normal commercial tape recorders — so that it is constantly in touch with the tape during movement both forwards and backwards.

In the following specification, the relays are all marked with capital letters, whilst the contacts relating to and operated by these relays are marked with the same small letters.

Impulse relay J therefore always responds when a control impulse is produced by the additional electromagnetic control head 3.

As a result of depressing the starting push-button X, the current circuit to relay C is closed through contact 1, which is now closed, and stays energized as a result of its self-holding contact $c_2$. Contact $c_1$ lies within the circuit of an electro-magnet VM which causes the tape 14 to be pushed by roller 22 against the drive shaft 21 or capstan unit of the tape recorder driven by motor 20. Because of the fact that contact $c_1$ is closed, magnet VM is energized and sets the tape in motion in forward direction (as shown schematically by dashed lines to motor 20), which is indicated for magnet VM by an arrow pointing to the right.

Upon a control impulse being issued from the tape 14 and read by control head 3, impulse relay J is briefly energized and closes its contacts $j_1$ and $j_2$ and a control impulse reaches the projector P through the closed contacts $j_1$ and the closed contact 6 and causes a corresponding change of picture. During an uninterrupted forward play of the tape, a step by step change of picture will take place with each control instruction magnetically marked on the tape. Consequently, a certain text section or lecture will coincide exactly with a given picture. The control impulses are located on the tape either on the second track of a dual sound track tape or on a control track located in a strip area between the two normal tracks.

At the end of a section of the recorded sound, the tape drive motor 20 should be stopped, for example, to afford the teacher an opportunity to give additional explanations, then the "step-by-step" push-button Z will be depressed by hand. Button Z is of the type that when pressed, it will be mechanically held in the "on" position. Contact 6 is opened and contact 7 of switch Z is closed, because the contacts themselves are mechanically joined together by coupling means 16. These contacts 6 and 7 cause stopping of the drive-unit or motor which drives the tape at the end of a text section, as soon as a control impulse occurs on the tape which, otherwise, would bring the next slide of the projector into projection position.

If now the tape recorder — with depressed button Z — is set in motion by push-button X, then the ensuing operation is at first the same as already described. As soon as control head 3 on the tape encounters a control signal, then impulse relay J is again brought into action, and in doing so, closes its contacts $j_1$ and $j_2$. As push-button Z remains depressed for the step-by-step operation, contact 7 is closed and contact 6 is open. Because contact 6 is open, no impulse can reach the projector P. With contact $j_2$ now closed, together with the closed contacts 7, $d_1$ and $c_3$, relay U is provided with current and operates, thereafter staying on by means of its self-holding contact $u_1$. Because contact $u_2$ is now closed, current is passed from the positive terminal over contact $j_2$, switch 7, contacts $d_1$, $c_3$, $u_2$ to the negative terminal of relay C, with the result that the latter is then deenergized because this is a " by-pass" circuit. But as contact $c_1$ lies in the circuit of the magnet VM and opens due to the deenergizing of relay C, the tape drive-unit is also stopped. Therefore no signal of impulse for changing from one to an other slide is sent to projector P because contact 6 of the still depressed button or switch Z still remains open.

When the tape drive-unit has been stopped, two possibilities present themselves, namely that either push-button X is again pressed, in order to let the tape continue in forward direction to the end of the next text section, or that the rewind button Y for reversing the direction of the tape travel for the repeat of the preceding text section is pressed by hand. Assume first of all that push-button X is operated to move the tape in forward direction. Because a new picture is required for the next text section, it is necessary that projector P receives a further switching impulse to set up the next picture for projection.

As a result of the preceding operations relay U is still energized due to its self-holding contact $u_1$. By pressing now on push-button X, a short impulse is given to the projector P through the closed contacts 2 and $u_3$ via the conductor $b$, to bring the next picture into the projection position. This impulse transmitted to the projector is therefore not picked up or generated from the tape, but connected by push-button X over line b and switch 2, controlled by hand. Then, the procedures already described are repeated. A further relay D with a contact $d_1$ is energized so that, at the beginning of running of the tape, a rest impulse taken up by head 3 causes no incorrectly reproduced control signal. This relay D operates as soon as push-button X is pressed, so that an impulse generated by the head 3 coming through contacts $j_2$ and switch 7 has no effect with reference to projector P, because contact $d_1$ is open. This relay D is a slow releasing relay, so that possible control impulses on the tape 14 are suppressed at the beginning of a new running of the tape in forward direction.

The other possibility is to have the tape reverse so that, upon subsequent forward movement, a section of tape is repeated. After the tape-drive has been stopped at the end of a section (button Z depressed) and if it is desired to repeat a tape section, the tape is rewound at greater speed, up to the preceding control impulse on the tape. To repeat a tape section, the "repeat"-button Y is pressed briefly by hand, so that contacts 8, 9 are briefly closed. The contacts 8 and 9 are mechanically joined together by coupling means 17. The circuit closed by contact 8 results in releasing relay U, which still was in operating position over its self-holding contact $u_1$. Releasing of this relay U is the effect of a "by-pass" circuit over contact 8, line $k$ to the negative terminal or bus. On the other hand, relay R is activated, which controls the electric motor controller to set the motor at a different rotational speed, with the result, that three to seven times — preferably five times faster windback speed of the tape is obtained as opposed to the normal forward speed of the tape. At the same time, relay L receives current, so that its self-holding contact $l_1$ is closed as well as its contact $l_2$ within the circuit if the rewind magnet RM. In addition, contact $l_3$ is closed.

As soon as head 3 senses a control impulse during tape rewind, impulse relay J is operated, and contact $j_2$ is closed. As a result of this, a circuit is closed through contacts $j_2$, switch 7, contacts $d_1$, $l_3$ to relay V and to the negative bus. Relay V locks to its own contact on self-holding contact. Because contact $v_2$ now is also closed, relay L is no longer energized and the current to rewind magnet RM is interrupted, and the rewind tape-drive unit is stopped, because contact $l_2$ is open. Because now the same tape section previously reproduced is being repeated, no change of picture should occur within projector P. The control impulse, therefore, causes no change pf picture in the projector P during rewind, but simply a cut-out of the tape-drive unit.

There still remains the further operating possibility, that, after one preliminary tape rewind, at least one further rewind should take place. In this case, projector P must also be switched back by one or an appropriate number of pictures depending on the number of tape sections.

From the foregoing description it is seen that relay V is kept energized by means of its self-holding contact $v_1$, if previously a first rewind action has taken place. If, from this contact position, a further rewind is to take place, immediately following a previous one, then by re-pressing the "repeat"-button Y by hand, a switch-back impulse is given to projector P through switch 8 and contact $v_4$. The action following then is the same as already described.

In order to create the desired current circuits, diodes 10 or rectifiers and resistances 11 are required as indicated in the drawing and as is obvious to those skilled in the art.

It will be understood that variations and modifications of the specific devices disclosed herein may be made without departing from the spirit of the invention.

Accordingly, What is claimed is:

1. Tape recorder and control system, adapted to operate in conjunction with an automatic slide changing type slide projector, responding to change-signals to change projection of an image, especially for use in a teaching system, wherein instruction items are recorded on tape to be reproduced by the tape recorder and wherein control signals are recorded on the tape, comprising means (20, 21, 22) including a motor (20) driving the recording tape (14), selectively, in forward and reverse direction;

means (VM, RM) controlling respective forward and reverse direction of the driving means;

a sound reproducing head (19) sensing instruction items recorded on the tape;

a control signal reproducing head (3) sensing control signals recorded on the tape, said control signal reproducing head (3) being located in the recorder with respect to the tape to sense control signals thereon when the tape is running either in forward, as well as in reverse direction;

first manually controllable switch means (V) having first and second selectively setable switching positions;

means (4, J, $j_1$, $j_2$) responsive to a signal from said control signal reproducing head (3) and connected to said first manually controllable switch means (V), said switch means establishing a connection, selectively and alternately to said projector (P) when in a first position and transmitting control pulses from said control signal reproducing head to call the projector to change projected images and, when in the second position, to connect two said tape driving means to transmit pulses from said control signal reproducing head to cause the tape driving means to stop the tape; and releaseable repeat switch means (Y, 8, 9) to control repetition of selected sections of the tape (14) connected to and controlling the motor direction control means (VM, RM), and circuit means to cause said tape drive means when operating in a reverse direction to stop upon sensing a recorded control signal on the tape, which forms, due to reverse running of the tape, the next preceding recorded control signal, the repeat switch means being interconnected by said manually controllable switch over means (Z) when in the second position.

2. System according to claim 1 further comprising hand operable switch means (X) including contact means (2, $b$, $u_3$) establishing a circuit transmitting change control signals for the projector to said projector to effect image change operation of said projection.

3. System according to claim 1 comprising controlled switching means (C);

a hand operable switching means (X) connected for activation to said controlled switching means (C), said controlled switching means, when activated, controlling the drive means for forward movement of the tape;

and interconnection means connecting said releasable repeat switch means (Y, 8, 9), said connection means (4, J, $j_1$, $j_2$), the control signal reproducing head (3) and the controlled switch means (C), to control the controlled switch means (C) into deactivated state to thereby disconnect the driving means and interrupt forward movement of the tape.

4. System according to claim 3 wherein the controlled switch means comprises a relay (C) having a holding circuit ($c_2$), the interconnection means including a circuit providing a bypass to said controlled switching means (C) to cause deactivation thereof.

5. System according to claim 1 comprising a directing circuit (L, $l_1$, $l_2$) energized by said releaseable switch means (Y, 8, 9), said directing circuit connecting control signals derived from said control head (3) to the tape drive means (20, 21, 22) and the tape control means ($R_m$) to control the tape to be driven in reverse direction, the tape stopping when a control signal is sensed and connected to the tape drive means by said controllable switch means (Z) in the second position.

6. System according to claim 5 wherein the directing circuit includes a switching element (L), said switching element being switched to disconnected position upon sensing of a control signal pulse.

7. System according to claim 1 further comprising contact means (2, $b$, U, $u_3$) establishing a circuit transmitting slide change signals to the projector;

a slow release relay means (D) having a circuit path connected in parallel to at least a portion of said contact means (U), the slow release relay suppressing pulses from said control signal reproducing head which may occur briefly after start of operation of the tape (14) in forward direction, to prevent spurous while changing.

8. System according to claim 1 including connection means (V, U) energized, respectively, and in accordance with the direction of operation of said tape drive means in conjunction with said tape control means ($V_m$, $R_m$), one of said connection means being energized if the tape drive means is controlled for operation in a forward direction, and the other of said connection means (U) being energized if the tape drive means is controlled for reverse direction, so that, respectively, the forward or reverse control means ($V_m$, $R_m$) are operative; and a hand operable switching means (X) commanding forward movement of the tape;

the connection means controlling forward movement of the tape being disabled upon operation of said repeat switch means (Y) and the connection means energized upon reverse operation of the tape being disabled upon operation of said and operable switch means (X).

9. System according to claim 1 including means (R) controlling the speed of operation of the tape when in reverse direction, said speed being controlled to be from 3 to 7 times faster than when in forward direction.

10. Tape recorder and control system to operate in conjunction with an automatic slide changer - type slide projector responding to slide change signals, specifically for teaching systems, wherein instruction items are recorded on the tape and wherein control signals are recorded on the tape (14) in conjunction with specific instruction items, the control signals being associated with specific instruction items and being placed to effect change of image projection of the slide projector upon presentation of new instruction items, comprising means (20, 21, 22) driving the magnetic recording tape (14), selectively, in forward and reverse direction;

means (VM, RM) controlling movement, and direction of movement of the tape;

a sound reproducing head to sense instruction items recorded on the tape (14);

means (3) sensing control signals recorded on the tape;

first means connecting the control signal sensing means (3) to the projector (P) to control changing of the projection image as a control signal is sensed;

first means interlocking the tape direction control means and said first connection means to effect the connection of the projector if, and only if the tape is commanded to operate in forward direction;

second means connecting the control signal sensing means to the tape control means to control the tape to stop; and second means interlocking the direction control means and said second connection means to effect the connection to the stop control if the tape is commanded to operate in reverse direction, said second interlocking means inhibiting application of pulses from the sensing means (3) to the projector (P) so that no change of image will occur when the tape has been commanded to run in reverse direction.

11. System according to claim 10 including manual switching means (X, Y) providing direction pulses to said projector to cause the projector to change images independently of sensed control signals derived from said tape, in either forward direction (X) or reverse direction (Y), said manual switching means being interlocked with the movement and direction control means controlling movement of the tape to prevent image changing of images in a forward direction if, immediately preceding, said tape has been commanded to operate in reverse direction for one instruction item, or to permit image changing in reverse direction after the tape has been commanded to run in reverse direction for one instruction item and is again commanded to run further in backward direction.

* * * * *